Patented May 19, 1953

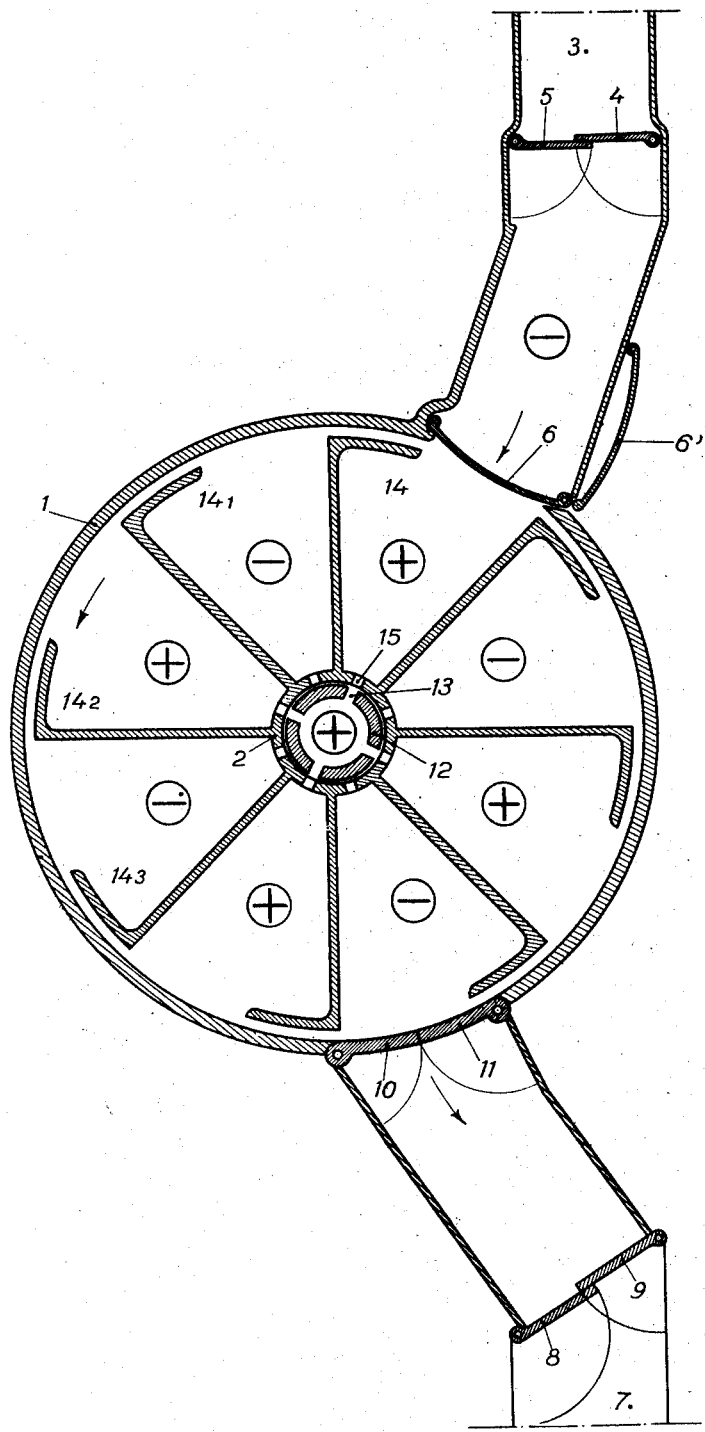

2,638,759

UNITED STATES PATENT OFFICE 2,638,759

PROCESS AND APPARATUS FOR BRINGING AN OBJECT TO A GIVEN TEMPERATURE

Pierre Guillaume Manuel Barris, Paris, France

Application February 5, 1948, Serial No. 6,514
In France February 10, 1947

2 Claims. (Cl. 62—173)

Several processes are known for precongealing (about 0° C.) and congealing (for instance at about —18° C.) various foodstuffs, for instance fish.

The most important among them are the following:

The oldest and simplest of these processes consists in surrounding foodstuff with ice bits whose size is of the order of a few centimeters. This process does not permit to bring the whole mass of the foodstuff below 0° C.

According to another process—congelation by air—the foodstuffs are subjected to a rapid draught of air at low temperature. This process leads to a heavy loss of weight by desiccation and frequently to the formation of comparatively large ice crystals which cause the bursting of the cells of the foodstuff and also to its oxidation and surface decoloration. The time required for the congelation amounts to several hours or several days, depending on the thickness of the treated foodstuff.

There are also various congealing processes with brine. Some of them use direct contact: the stuff is immersed in the brine or sprayed with it under the form of a more or less atomized shower; the inconvenience of those processes is that they lead nearly always to the penetration of the salt into the stuff. In other congealing processes, brine does not come in contact with the stuff and cools it through an intermediate metallic wall. The main inconvenience of those processes is that usually the foodstuff cannot mould itself against the wall, so that air cushions are remaining between them which hinder the transmission of cold. All those congealing processes by brining, require several hours of treatment even for articles which are only a few centimeters thick.

Furthermore, in all the processes cited above, there is a considerable loss of thermal units (frigories).

The main object of the present invention described hereunder is to provide a process which eliminates those inconveniences and an appropriate apparatus to carry it out. This process is characterized by the fact that the foodstuffs or objects to be precongealed or congealed, are subjected in a special chamber to the contact of a cryogenous mass of microscopic ice pellets which are brought on them by a draught of air or gas, which is itself at a very low temperature, so that the said foodstuffs or objects are rapidly enshrouded in a shell which is at such a temperature (for instance much lower than the one required for their congelation) that they are brought down to the required thermal conditions.

Another object of the invention is to obtain a shell which enshrouds the treated foodstuff or object with a continuous and airtight cover, this being particularly indispensable for the preservation of foodstuff.

Still another object of the invention is to provide some means for obtaining at will any desired size of crystals inside the cells of the treated foodstuff. It is known that when congealing foodstuff and particularly fish, crystals are forming inside the cells of the treated article, but these crystals may be of any haphazard size which may cause the bursting of the stuff. One characteristic of this process, is that the size of the ice pellets which are used in the aforesaid manner for precongealing or congealing the stuff, can be adjusted up as desired for obtaining the required size of crystals within the cells of the precongealed or congealed foodstuff.

One knows that a crystal which is used as crystallising germ when it is introduced for instance in a supersaturated solution results in a crystallisation of the same system and size. This can be obtained also with the crystals deposited upon the foodstuff and which cause the crystallisation of the liquids existing inside the cells of the said foodstuff. By adjusting the size of the crystallised ice pellets used for precongealing or congealing the foodstuff according to the present invention the proper size of crystals inside its cells can therefore be obtained and by adjusting the size of the drops which produce the ice pellets one can adjust the size of the latter.

The enshrouding operation mentioned above is very rapidly effected with the minimum loss in the exchange of heat between the treated stuff and its shell and the enshrouded foodstuff is immediately brought to the cold storage room.

By way of example, an embodiment of the said process has been described hereunder for its application to precongealing or congealing of fish, also applicable to other foodstuffs, particularly meat, fruit, vegetables.

To ensure a perfect and long preservation the foodstuffs must be absolutely fresh, sound and intact.

In an application for a French Patent No. 1,003,676 on the same date, entitled "Process for Obtaining at a Given Temperature a Mass Constituting a Source of Heat and Apparatus for Applying the Said Process," applicant has described an invention permitting to obtain a draught of conveying fluid, for instance a draught of air or any other gas with a low freezing point which carry a dispersion of microscopic ice pellets of the order of the micron (water, syrup, brine, carbon anhydride, etc., at a very low temperature) which can drop down for instance till —200° C.

That other invention can be used with great advantage to obtain the enshrouding of the articles in a shell for their treatment according to the invention.

By way of example, an apparatus for obtaining this enshrouding has been described hereunder and described diagrammatically in the attached drawing.

Inside a stationary housing 1, a drum 2 is rotating which is divided in eight chambers, each of them being intended, for instance to receive fish. At the upper part is provided a supplying duct 3 fitted with a sieve constituted by a double hinged door 4—5 and by a juggling door 6; in the same manner at the lower part is provided an outlet duct 7 also fitted with a sieve constituted by two double hinged doors 8—9 and 10—11.

The axle of the drum 2 is hollow and inside the said axle is arranged a distributor 12 provided with four longitudinal slits 12 lying in two planes at right angles.

Chambers 14, 14₁, 14₂, 14₃ ... of the drum are each provided with a corresponding slit 15.

The gas charged with microscopic ice pellets at the chosen low temperature comes in through distributor 12. Owing to the very conditions in which it is produced, the dispersion of the microscopic pellets is positively electrified.

In order to adjust the size of the ice pellets, a device (not shown) is provided to adjust the size of the drops of the injected liquid. It consists, for instance, of a device adjusting the relative speed of the draughts of the injected liquid and carrier gas which conveys the drops, or again, a device adjusting the outlet of the injections.

The apparatus comprises a source of electrostatic potential which electrifies negatively the admitting sieve as well as the fish in the said apparatus and the chambers as they pass through each of the four positions 14₁, 14₃, 13₅—14₇ in which they do not communicate with the distributor. In the four other positions 14, 14₂, 14₄—14₆ the said chambers receive the gas charged with the positively electrified microscopic pellets and in this way the chambers with the fish are brought back to zero potential or to a negative potential. These devices are diagrammatically shown by the indication of the + and − signs on the required places on the drawing.

The apparatus operates as follows:

In chamber 14, the fish charged negatively in passing through the introduced gas are swept by the flux of microscopic positive pellets at a very low temperature; the latter are violently attracted and are drawn apart from the gas which conveys them and deposit and settle strongly on the fish. On the following compartment 14₁, the fish are brought back to a negative potential and turned over; then in 14₂ there is a new introduction of gas and a new deposit. After a three-quarter of turn, or eventually after several turns, each fish happens to be enshrouded in a shell of sufficient thickness; for instance for a long type of fish, 10 cm. thick at +15° C., a shell 5 mm. thick at −150° C. will be sufficient to bring it down later at 0° C.

The first layer of microscopic pellets which covers the fish is melting in the first place and then freezes again at the contact of the following pellets, thus forming a layer of adherent ice which is continuous, airtight, and covered with a dry and snowy layer.

This first iced layer conveys the heat of the fish to the cold shell at a high rate on account of the intimate contact and the high conductivity of ice at a very low temperature; it prevents the fish from being oxidized and it prevents the action of light and other harmful radiations; it prevents desiccation, decoloration and the penetration of salt, sugar, etc.

When it is desired to preserve the fish into its state of congelation (for instance −18° C.), a brine freezing at −18° C. is used as liquid for forming the pellets and the fish treated is stored at a temperature slightly below −18° C.

The outer part of the shell is a snowy layer of agglomerated microscopic pellets around each of which is strongly absorbed a layer of the conveying gas. This constitution makes an excellent thermal insulation out of the said shell. Should the fish enshrouded in this way be subjected during handling to temperatures higher than −18° C., the said shell constitutes a reserve of cold and through its progressive melting it protects the fish for a while against its warming up again above 18° C.

Fish covered with its shell is placed in cases in which empty spaces are filled with the same kind of pellets as the one used for making the shells.

In the treating apparatus for causing the deposit of the dispersion conveyed by the gas, any electrical or mechanical means or their combination can be used. For instance this deposit may be obtained through a drop in the speed, or through gravity, centrifugation, etc.

In the same manner to obtain the fixation of this dispersion on the fish one may proceed by a pressure, or by any other electrical or mechanical effect or their combination.

The pulverized body which is used for constituting the shell can be obtained by any other process and apparatus than those of the cited patent. For instance for precongealing foodstuff one can use in order to form the shell some ice ground finely with the size of a few millimeters and at the temperature of a few degrees below 0° C.

What I claim is:

1. The process of imparting to foodstuff and like objects a predetermined final temperature comprising the steps of dispersing atomized liquid by means of rapidly moving gas of relatively very low temperature, directing said dispersed liquid onto said foodstuff, whereby a shell-like layer of microscopic ice pellets in which said gas is absorbed, is deposited on said foodstuff, permitting said layer to melt, subsequently causing contact of said layer with a further layer of ice pellets to thereby cause freezing of said first mentioned layer and adherence of the resultant ice layer to the foodstuff so as to enshroud same in a continuous and substantially airtight manner, and then storing the thus enshrouded foodstuff at a temperature ensuring the enshrouded foodstuff to reach said predetermined final temperature while thermal exchange between said foodstuff and said layer with which the former is enshrouded, takes place.

2. The process according to claim 1, wherein atomized liquid is in the form of brine freezing at about −18° C., below which said foodstuff is stored.

PIERRE GUILLAUME MANUEL BARRIS.

References Cited in the file of this patent

UNITED STATES PATENTS

| Number | Name | Date |
|---|---|---|
| 724,554 | Davis | Apr. 7, 1903 |
| 1,035,777 | Bullock | Aug. 13, 1912 |
| 1,063,170 | Lincoln | May 27, 1913 |
| 1,933,257 | Goosmann | Oct. 31, 1933 |
| 2,400,951 | Reid | May 28, 1946 |